United States Patent [19]

Jorgensen et al.

[11] 4,029,907

[45] June 14, 1977

[54] ASYNCHRONOUS DIGITAL REPEATER

[75] Inventors: Adam A. Jorgensen, Rochester; Norman L. Rose, Penfield; Thomas F. Lewis, Macedon, all of N.Y.

[73] Assignee: Stromberg-Carlson Corporation, Rochester, N.Y.

[22] Filed: July 13, 1976

[21] Appl. No.: 704,984

Related U.S. Application Data

[63] Continuation-in-part of Ser. No. 593,660, July 7, 1975, abandoned.

[52] U.S. Cl. .................. 179/16 EA; 178/70 R; 328/164
[51] Int. Cl.² ................................ H04Q 1/36
[58] Field of Search .......... 328/164, 207; 307/273; 178/70 R, 70 TS; 179/16 E, 16 EA, 15 AD, 170 R

[56] References Cited

UNITED STATES PATENTS

| | | | |
|---|---|---|---|
| 3,452,220 | 6/1969 | Fritschi | 179/16 E |
| 3,456,554 | 7/1969 | Goodwin | 307/273 |
| 3,676,699 | 7/1972 | Warren | 328/164 |
| 3,794,775 | 2/1974 | Hicks et al. | 179/16 EA |
| 3,838,297 | 9/1974 | Bardo et al. | 328/164 |
| 3,908,091 | 9/1975 | Waldeck | 179/16 EA |
| 3,935,392 | 1/1976 | Smith et al. | 179/16 EA |

Primary Examiner—Kathleen H. Claffy
Assistant Examiner—Randall P. Myers
Attorney, Agent, or Firm—Hoffman Stone; William F. Porter, Jr.

[57] ABSTRACT

An asynchronous, regenerative, digital repeater for use in bipolar digital signalling systems includes an amplifier for receiving and amplifying incoming signals, a first monostable multivibrator for producing regenerated pulses responsively to the output of the amplifier, an output circuit for producing a bipolar pulse train responsively to the output of the multivibrator, and a second multivibrator for inhibiting the first multivibrator for a predetermined interval following the trailing edge of each output pulse to prevent the first multivibrator from responding to the electrical overshoot at the trailing edges of the incoming pulses.

3 Claims, 1 Drawing Figure

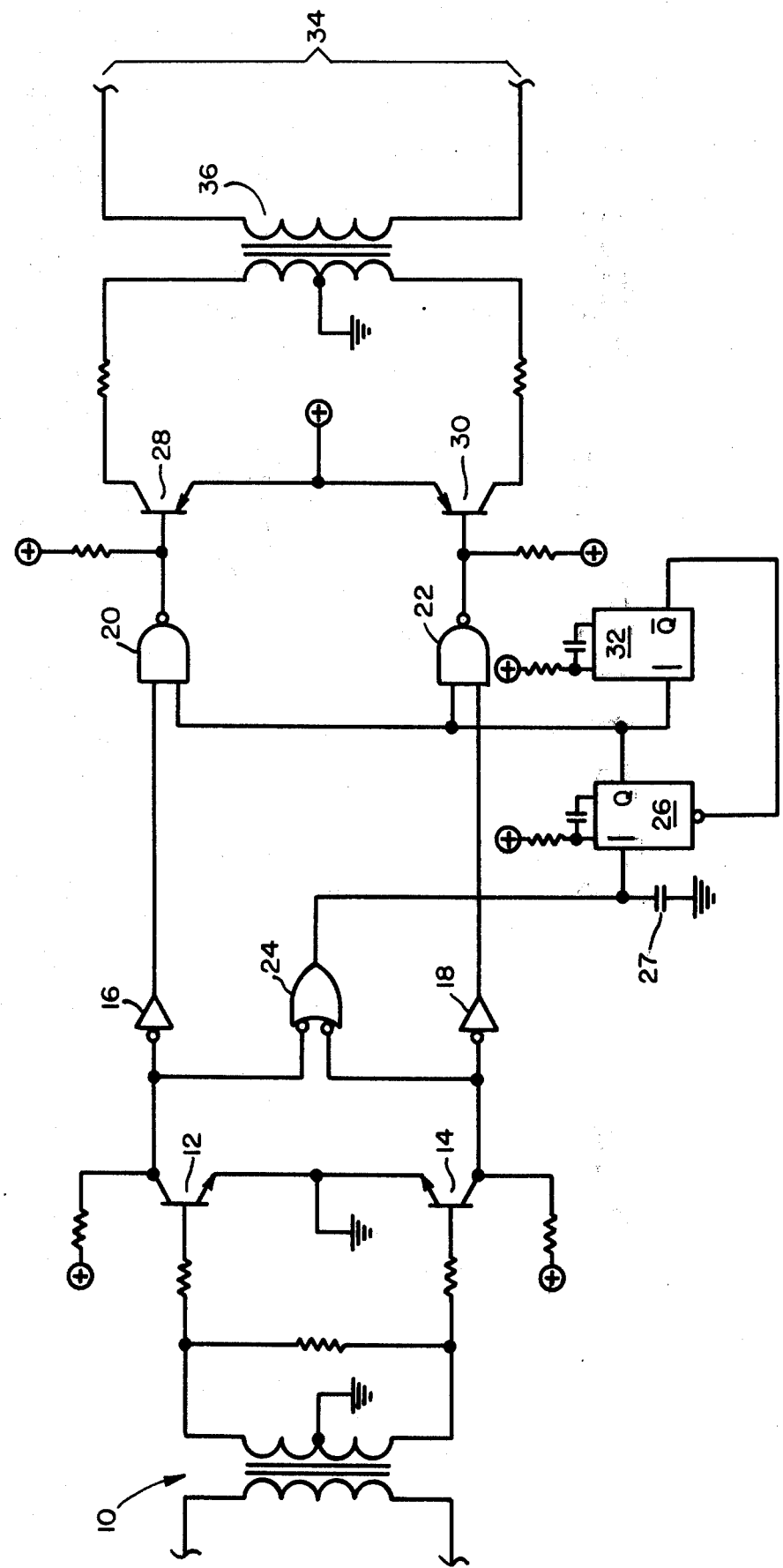

ASYNCHRONOUS DIGITAL REPEATER

BRIEF DESCRIPTION

This application is a continuation-in-part of co-pending application Ser. No. 593,660, filed July 7, 1975, and now abandoned.

This invention relates to a novel, asynchronous, bipolar, digital repeater of extremely simple construction for use especially in telephone systems, having a high degree of immunity from noise, and capable of responding reliably to signals transmitted over lines of widely varying lengths.

Practically all digital repeaters presently in commercial use in telephone systems includes means for sensing the timing of the incoming signals and producing locally a so-called clock signal synchronous with the clock at the transmitter which times the incoming signals at their point of origin. Because of this most repeaters in actual use are relatively complex and expensive. Asynchronous repeaters are also known but have not heretofore been regarded as sufficiently reliable for use in telephony, primarily because of their tendency to respond to so-called noise and generate spurious, or false output signals. The noise factor that has been found to be especially troublesome is the so-called over-shoot on the trailing edges of the incoming pulses, which is aggravated by signal degradation in the transmission line. There have also been problems in devising a circuit that will repeat reliably regardless of the distance from the point of origin of the incoming signals, which in practice may be as little as a few up to about six thousand feet.

The repeater of the invention has been found to be substantially immune to the effects of noise, and to be exceptionally reliable in operation regardless of the length of the line between it and the point of origin of the incoming signals. It includes a monostable multivibrator for regenerating pulses responsively to the incoming pulses, and a second multivibrator for inhibiting the regenerating one for a predetermined interval following each regenerated pulse, typically about one-half the duration of the time slot assigned to one of the signal pulses used in the system.

The incoming pulses are amplified and applied to one or the other of a pair of output gates depending on the polarity of the pulses. The pulses, in amplified form, are also applied to trigger the regenerating multivibrator, the output of which enables both of the output gates during the interval timed by it. The outputs of the output gates are coupled through separate transistor amplifiers and an isolating transformer to the ongoing transmission line. The output of the regenerating multivibrator is also applied to an "inhibit" multivibrator, which is connected to inhibit the regenerating multivibrator for an interval following each time-out of the regenerating multivibrator sufficiently long to immunize the circuit from the effects of noise on and following the trailing edges of the incoming pulses.

Satisfactory results have been demonstrated in systems in which the pulse repetition rate is at least one megaHertz, and on lines as short as ten feet and as long as six thousand feet.

DETAILED DESCRIPTION

A presently preferred embodiment of the invention will now be described in conjunction with the accompanying drawing, wherein the single FIGURE is a schematic diagram of a repeater circuit according to the presently preferred embodiment of the invention.

Referring now to the drawing, the circuit as shown includes an input transformer 10 for matching the line impedance and stepping up the voltage of the incoming pulses. The secondary winding of the transformer 10 is connected between the bases of a pair of transistors 12 and 14, respectively, for turning on one or the other of the transistors in response to an incoming pulse depending on the polarity of the incoming pulse. The collectors of the transistors are connected through separate amplifiers 16 and 18, respectively, to inputs of respective gates 20 and 22. The collectors of the transistors 12 and 14 are also connected through an OR gate 24 to the trigger input terminal of a regenerating multivibrator 26, which, when it is triggered, produces an output pulse of a duration conforming to the design of the system in which the repeater is used.

The threshold value of the voltage required to trigger the multivibrator 26 is set in accordance with usual practice by the value of a capacitor 27 connected between the trigger terminal and ground. The capacitor 27 keeps the multivibrator from responding to low level noise at the input to the circuit.

The output of the regenerating multivibrator 26 is applied to separate respective input terminals of the gates 20 and 22 for enabling the gates during the intervals timed by the multivibrator. While the multivibrator 26 is timing out the gates 20 and 22 are enabled, and one or the other of them produces an output signal depending on the polarity of the incoming signal, which determines which one of the transistors 12 and 14 is turned on. The outputs of the gates 20 and 22 are connected to drive separate transistor amplifiers 28 and 30, respectively, the outputs of which are fed to the outgoing line 34 through a transformer 36. The outputs of the two transistors 28 and 30 constitute the repeated, regenerated signal. The transformer serves primarily to provide d.c. isolation between the transistors 28 and 30 and the line 34.

The circuit is immunized from noise in the incoming signal by a second monostable multivibrator 32, which is connected to be set on the trailing edge of each output pulse from the regenerating multivibrator 26 and to produce a pulse about one-half the duration of the time slot assigned to the regenerated pulse. The output of the second multivibrator 32 is applied to the CLEAR terminal of the regenerating multivibrator 28 to inhibit it until the second multivibrator times out.

The principal noise that causes trouble in pulse repeaters appears to be the so-called over-shoot on the trailing edges of the incoming signals, and, in the operation and testing of the present circuit, it has been found that for transmission distances within the accepted range of about ten to about six thousand feet, this noise does not persist for significantly longer than about one-half the design duration of the time slot assigned to one of the pulses. Therefore, even though the transistors 12 and 14 and the amplifiers 16 and 18 amplify the noise and apply it to the trigger terminal of the regenerating multivibrator 26, the multivibrator does not react to it.

What is claimed is:
1. An asynchronous, regenerative, digital repeater circuit for use in a bipolar signalling system comprising:
    a. a first monostable multivibrator having a characteristic period approximately equal to the design duration of the pulses to be repeated, b. means for triggering said multivibrator in response to the leading edge of each of each received pulse,
c. a second monostable multivibrator having a period approximately equal to one-half the duration of the time slot assigned to each received pulse, said second multivibrator being connected to an output of said first multivibrator to be triggered on the trailing edge of each pulse produced by said first multivibrator, an output of said second multivibrator being connected to said first multivibrator to inhibit said first multivibrator during time-out of said second multivibrator, and
d. means for producing a bipolar train of output pulses in response to the output of said first multivibrator.

2. A repeater circuit according to claim 1 wherein said means for triggering includes first and second amplifiers responsive respectively to incoming pulses of opposite respective polarities, an OR gate, means connecting the outputs of said amplifiers to respective inputs of said OR gate, and means connecting the output of said OR gate to the trigger terminal of said first multivibrator.

3. A repeater circuit according to claim 2 including also a pair of NAND gates, means for applying output signals from said first amplifier to an input terminal of one of said NAND gates and the output signals from said second amplifier to an input terminal of the other one of said NAND gates, means for applying an output signal from said first multivibrator to an input terminal of each of said NAND gates for enabling said NAND gates during time-out of said first multivibrator, and coupling means for applying output signals from said NAND gates to a signal transmission medium.

* * * * *